Sept. 29, 1931.  I. CHAR  1,825,220
MOTOR GRADER TRACTOR STEERING DEVICE
Filed Oct. 10, 1928  2 Sheets-Sheet 1

INVENTOR
Isaac Char

Sept. 29, 1931.  I. CHAR  1,825,220
MOTOR GRADER TRACTOR STEERING DEVICE
Filed Oct. 10, 1928  2 Sheets-Sheet 2
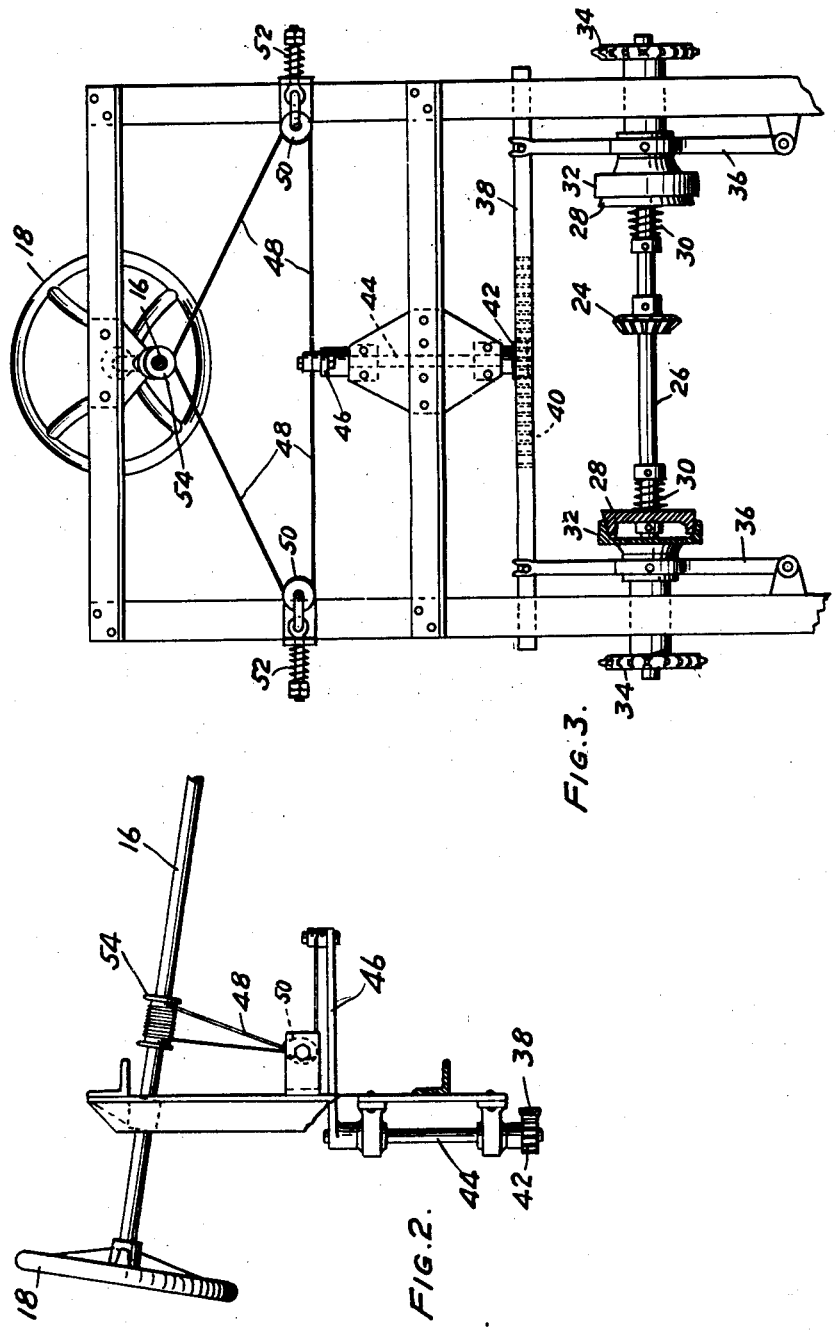
INVENTOR
Isaac Char Patented Sept. 29, 1931

1,825,220

UNITED STATES PATENT OFFICE

ISAAC CHAR, OF KENNETT SQUARE, PENNSYLVANIA, ASSIGNOR TO AMERICAN ROAD MACHINERY COMPANY, OF KENNETT SQUARE, PENNSYLVANIA, A CORPORATION OF DELAWARE

MOTOR GRADER TRACTOR STEERING DEVICE

Application filed October 10, 1928. Serial No. 311,458.

This invention relates to a steering device for a motor grader tractor and more particularly relates to a device for a tractor having one end supported upon dirigible wheels and the other end provided with tractor driving means supported on endless tracks and adapted to disconnect one or the other of said tracks upon turning of the dirigible wheels.

A road grader of the type formed by connecting to a tractor a blade supporting frame is of considerable length and if an attempt is made to turn the same by steering the dirigible front supporting wheels while maintaining the tractor treads in driven relationship, it is found that very considerable stresses are set up within the machine and that turning a sharp corner is rendered very difficult.

It is accordingly the object of the present invention to provide means operated simultaneously with steering of the dirigible wheels to disconnect one or the other of the tractor supporting traction devices so as to permit relatively sharp turns to be made without undue stresses.

In the drawings:

Fig. 2 is a fragmentary section showing the controlling means for disconnecting the traction devices of the tractor.

Fig. 3 is a transverse section disclosing the controlling means.

Figure 1:
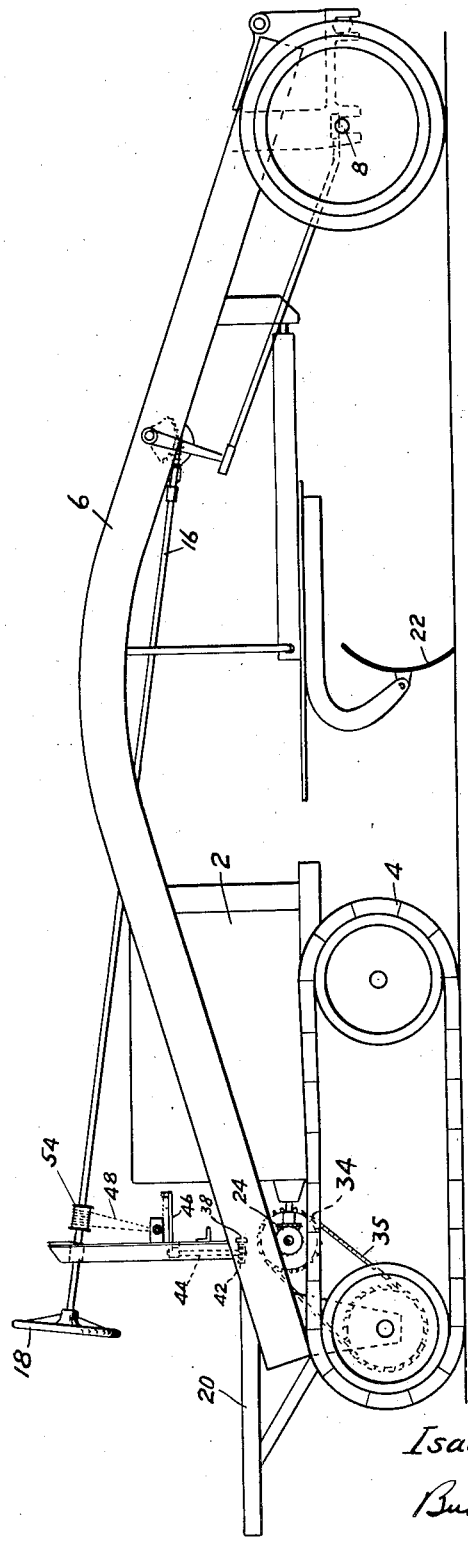
Fig. 1 is a diagrammatic elevation of a motor grader tractor in which the present invention is embodied.

The motor grader comprises a tractor 2 provided with the usual form of engine and supported on endless track treads 4. Extending forward over this tractor in a well-known manner is a frame 6 in the front end of which is pivoted, as indicated at 8, a front axle carrying dirigible wheels adapted to be turned by the usual form of steering connections through turning of steering rod 16 which is adapted to be moved through a wheel 18 adjacent an operator's station 20. The frame carries a blade or scarifier, or the like, such as indicated at 22, which is universally mounted and adjustable in any usual fashion.

The motor shaft drives through bevel gears 24 and transverse shaft 26, on which are splined clutch members 28 urged against collars secured to shaft 26 by means of springs 30 which react against other collars fixed on the shaft. Cooperating with each clutch member 28 is a second clutch member 32 carried by a sleeve slidable and rotatable freely upon shaft 26. Each sleeve carries a sprocket wheel 34 which, by means of a chain 35 trained around the sprocket on a supporting wheel for an endless track, serves to drive the said tractor.

Pivoted to the frame are levers 36 which are forked and provided with pins engaging within annular slots in the clutch collars. As shown in Fig. 3, these levers extend upwardly and are provided with forked ends engaging pins carried by a rack member 38 on which are formed teeth 40 arranged to mesh with a pinion 42 carried by a vertical shaft 44 having suitable bearings in the frame. Shaft 44 at its upper end is provided with an arm 46 to which are secured flexible cables 48 trained around pulleys 50 and wound in opposite directions about a drum 54 carried by steering rod 16. Pulleys 50 are urged outwardly by means of compression springs 52 so that if undue resistance is afforded to movement of lever 46 the springs will yield and pulleys 50 may move outwardly to prevent destruction of any of the parts.

In operation, if steering rod 16 is rotated to turn axle 10 to steer the grader, one of cables 48 is wound upon drum 54, while the other is similarly unwound therefrom. As a result, motion is imparted to lever 46 and, through the connections described, to levers 36. As a consequence, the members of one of the clutches are moved more tightly into engagement, the spring 30 thereof yielding to permit such movement, while the opposite clutch members are disengaged, thus throwing the endless track on that side out of operative driving relationship with the tractor engine. The endless track thus thrown out of engagement is, of course, the one which is upon the inside of the turning curve. Thus the device acts to maintain one of the tracks in propelling relationship to move the grader while the other track is thrown out of connection so as to permit motion either more slowly or even backwardly to effect a sharp turn without the setting up of stresses.

It will be clear that many changes may be made in the apparatus disclosed without departing from the spirit of the invention, for example, as is usual in devices of this character, disc clutches may be used, cone clutches being illustrated primarily for clearness.

What I claim and desire to protect by Letters Patent is:

In combination, a frame, dirigible traction means supporting one end of the frame, traction devices supporting the opposite end of the frame at opposite sides thereof, means for driving said traction devices including a clutch for each, means for steering said dirigible traction means including a rotary steering rod, a drum carried by the rod, and connections whereby one or the other of said clutches is disengaged upon actuation of the steering means including flexible members arranged to be wound on said drum, a pinion arranged to be rotated by movements of the flexible members, a sliding rack driven by the pinion and lever connections between the rack and clutches, said traction devices consisting of endless tracks.

In testimony of which invention, I have hereunto set my hand, at Philadelphia, Pennsylvania, on this 6th day of October, 1928.

ISAAC CHAR.